United States Patent [19]

Moriki et al.

[11] Patent Number: 4,718,228

[45] Date of Patent: Jan. 12, 1988

[54] APPARATUS FOR DISPLACING A LINE OF TRACK CHAIN

[75] Inventors: Yasumitsu Moriki; Hirotomo Numakura; Masayuki Fukui, all of Tokyo, Japan

[73] Assignee: Maruma Jyusharyo Kabushiki Kaisha, Tokyo, Japan

[21] Appl. No.: 647,039

[22] Filed: Sep. 4, 1984

[30] Foreign Application Priority Data

Sep. 5, 1983 [JP] Japan ................... 58-137514

[51] Int. Cl.$^4$ ........................................... B21L 19/00
[52] U.S. Cl. ........................................... 59/7; 59/901; 72/420; 414/750
[58] Field of Search .............. 59/1, 5, 7, 8, 10, 11, 59/12, 901; 72/420, 419, 291; 83/278, 247; 414/750

[56] References Cited

U.S. PATENT DOCUMENTS

| | | | |
|---|---|---|---|
| 678,753 | 7/1901 | McCool | 72/291 |
| 2,190,889 | 2/1940 | Schunck | 72/291 |
| 3,028,723 | 4/1962 | Kaplan et al. | 59/8 |
| 3,028,724 | 4/1962 | Kaplan et al. | 59/7 |
| 3,504,585 | 4/1970 | Harris | 83/247 |
| 3,813,974 | 6/1974 | Friberg et al. | 83/247 |

Primary Examiner—Robert L. Spruill
Assistant Examiner—David B. Jones
Attorney, Agent, or Firm—Bruce L. Adams; Van C. Wilks

[57] ABSTRACT

An apparatus for displacing a line of track chain is disclosed which is employable for the purpose of disassembling, assembling, or reassembling the chain. A guide table for guiding movement of the chain is adapted to tilt only in the upward direction together with a pair of rails which are raised or lowered by actuating a first cylinder. A trolley moves forward and backward in the space as defined by both the rails by actuating a second cylinder while it is guided along the rails. The trolley is provided with an engagement rod which extends upwardly therefrom through a slot on the guide table to come in engagement to a bushing in the chain. Forward displacing of the chain is achieved by way of the steps of tilting up the guide table together with the rails by actuating the first cylinder, displacing the trolley forward by a distance equal to one pitch of the chain by actuating the first cylinder, lowering the rails to the lowermost position by retracting the first cylinder and displacing the trolley backward to the initial position by retracting the second cylinder. A distance of displacement of the chain is adjustably determined by selectively determining the position of two stoppers on a stationary screw spindle which is extended below the rails in parallel to the latter. Each of the stoppers is adapted to abut against an abutment member fixedly secured to the bottom of the trolley.

10 Claims, 5 Drawing Figures

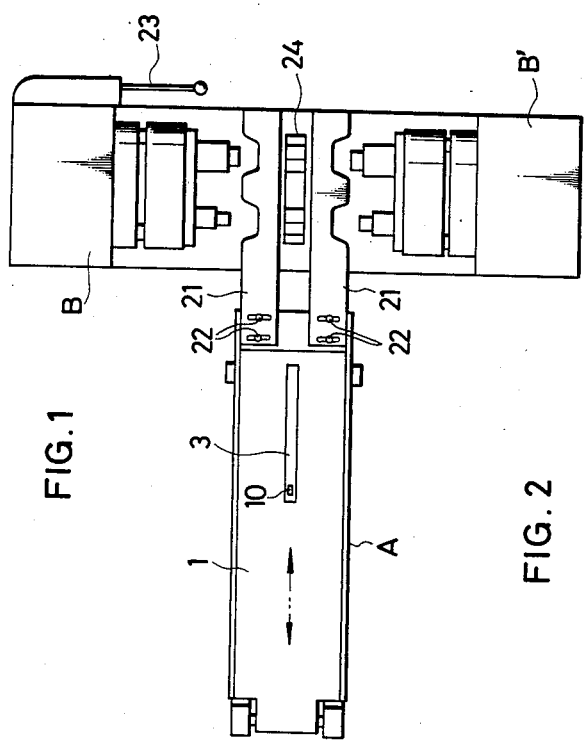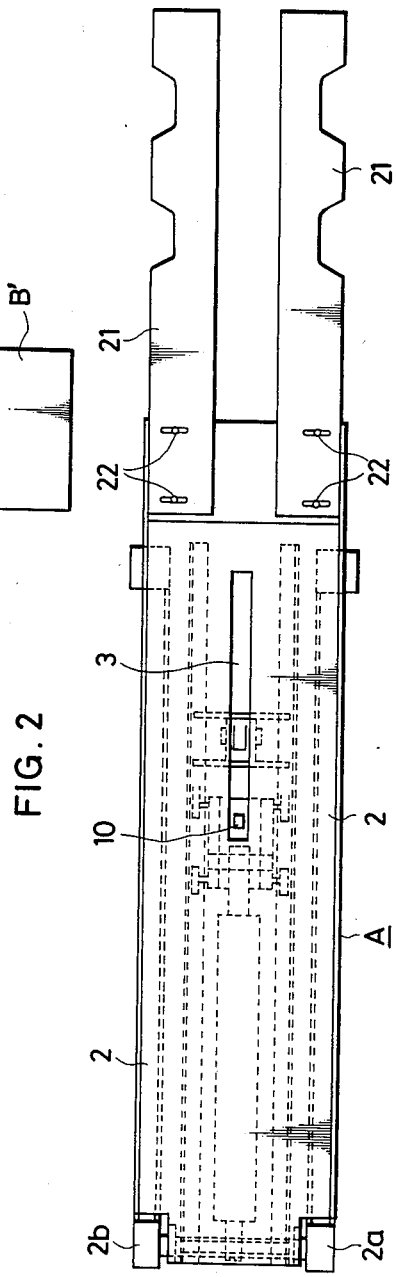

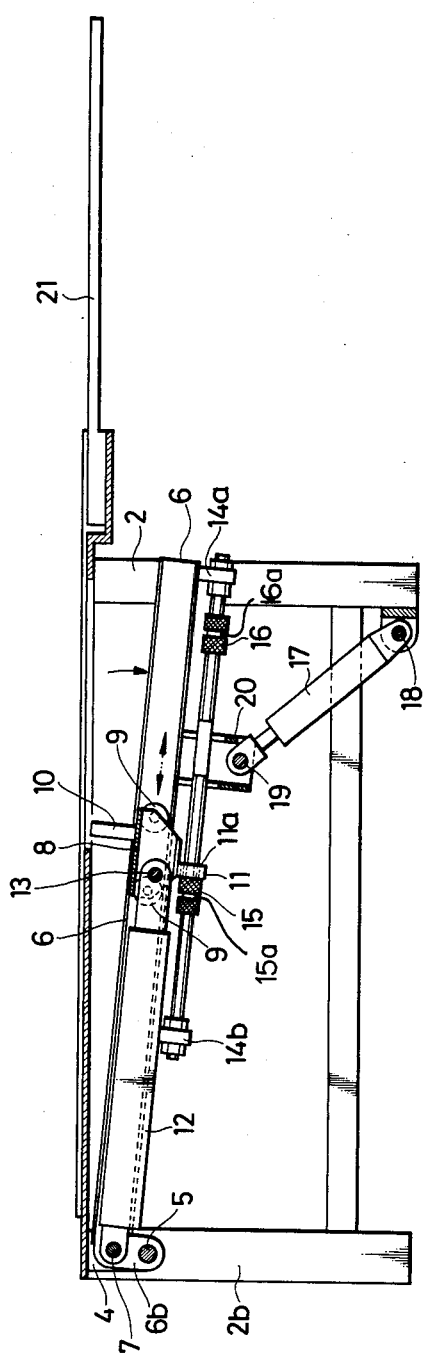
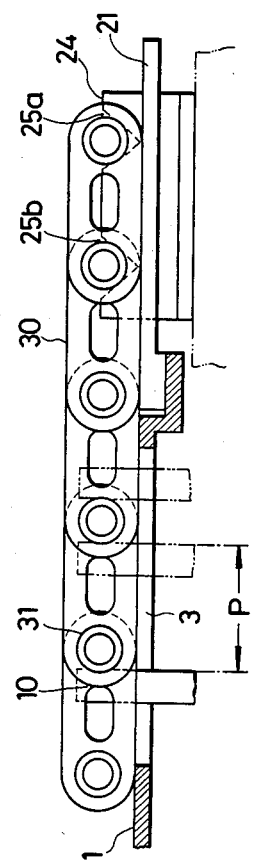
FIG. 4
FIG. 5

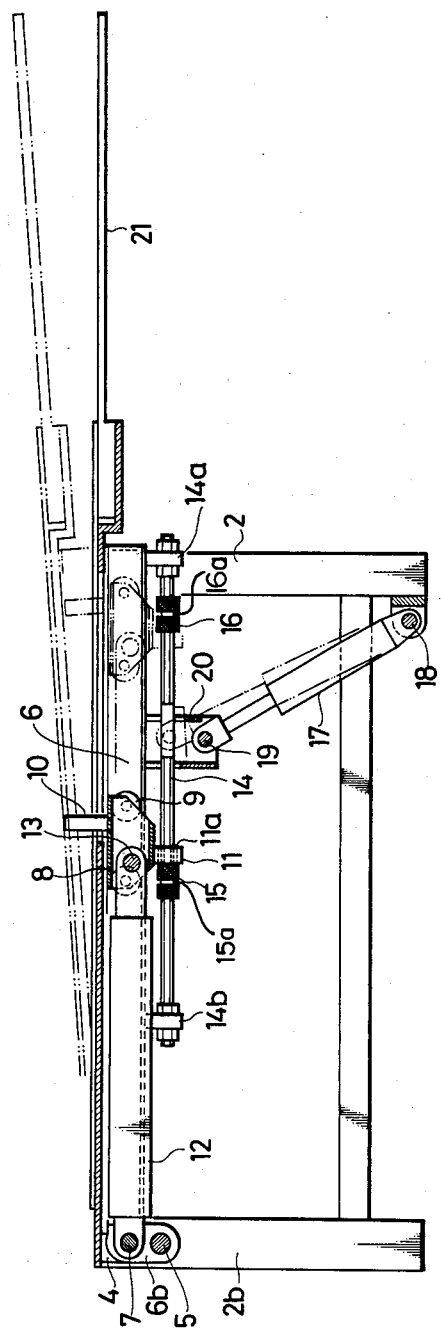

APPARATUS FOR DISPLACING A LINE OF TRACK CHAIN

BACKGROUND OF THE INVENTION

1. Field of the Invention

The present invention relates to an apparatus for displacing a line of track chain, and more particularly, to an apparatus for displacing a line of track chain such as employed for a bulldozer or like machine in which a line of track chain is displaced toward a pair of track presses for the purpose of disassembling it, or after chain links are assembled or reassembled to form a line of track chain, the track chain is displaced away from the track presses step by step, whereby the amount of displacement can be adjustably determined without difficulty.

2. Description of the Prior Art

The displacement of a line of track chain has been heretofore carried out by visually judging the displacement of the track chain relative to a stationary jaw insert located at the middle position between an opposing pair of track presses. However, when the track chain fails to be properly fitted to the jaw insert, there is the necessity for repeatedly performing inching operations. For this reason, assemblying, reassembling or disassembling of a line of track chain is unavoidably achieved at a low operational efficiency. Another problem of the conventional apparatus of the above-mentioned type is that there exists a danger that the track presses will be operated even when the cooperating pins and bushings are not correctly located at a predetermined position relative to the press jigs for the track presses.

Obviously, the operational efficiency of assembling, reassembling or disassembling of a line of track chain varies substantially in dependence on the performance of the apparatus used for displacing the track chain. Further, to assure that an intended operation is performed safely on the track presses there is necessity for an apparatus for displacing a line of track chain forward exactly to the track presses or away from the same. It should be added that the required apparatus should be employable for all types of track chains having configurations and dimensions which vary in dependence on their application.

SUMMARY OF THE INVENTION

Thus, the present invention has been made with the foregoing problems in mind.

It is one object of the present invention to provide an apparatus for displacing a line of track chain to a position exactly located relative to track presses.

It is another object of the present invention to provide an apparatus for displacing a line of track chain in which a distance of displacement of the track chain can be easily determined in dependence on the type of track chain to be disassembled, assembled or reassembled.

To accomplish the above objects there is proposed accccording to the present invention an apparatus for displacing a line of track chain by a predetermined distance in the longitudinal direction, essentially comprising a guide table with a slot formed thereon in the longitudinal direction, the rearmost end of the guide table being pivotally connected to a stationary frame structure, a pair of rails adapted to tilt up and down together with the guide table by means of a first cylinder, and a trolley movably supported on the rails to move forward and backward by means of a second cylinder. The trolley is provided with an engagement rod which extends upwardly therefrom through the slot on the guide table to come in engagement to a bushing in the track chain, and an abutment member fixedly secured to the bottom of the trolley to abut against either of two stoppers which are threadably mounted on a stationary screw spindle, the stoppers serving to determine the distance of displacement of the track chain by selectively determining their position on the stationary screw spindle.

In a preferred embodiment of the invention, each of the stoppers is constructed by a combination of two nuts with an elastic member interposed therebetween, the latter being made of rubber or the like material in the form of an O-ring.

Further, each of the rails for guiding movement of the trolley is made in the form of an U-shaped rail having an U-shaped groove which serves to hold the rollers therein which are rotatably carried on the trolley.

The top end of the first cylinder is pivotally connected to the rails, while the bottom end of the same is pivotally connected to the frame structure.

The foremost end of the second cylinder is operatively connected to the trolley, while the rearmost end of the same is connected to the rails.

Other objects, features and advantages of the present invention will become more clearly apparent from a reading of the following description which has been prepared in conjunction with the following drawings.

BRIEF DESCRIPTION OF THE DRAWINGS

The accompanying drawings will be briefly described below.

FIG. 1 is a plan view of the whole system for assembling, reassembling or disassembling a line of track chain with the aid of the apparatus of the invention.

FIG. 2 is a plan view of the apparatus of the invention.

FIG. 3 is a side view of the apparatus in FIG. 2.

FIG. 4 is a side view similar to FIG. 3, particularly illustrating a pair of rails lowered to the lowermost position by retraction of the first cylinder.

FIG. 5 is a fragmental enlarged sectional side view of the apparatus, paticularly illustrating the engagement rod on the trolley comes in engagement with a bushing in the track rail.

DESCRIPTION OF THE PREFERRED EMBODIMENT

Now, the present invention will be described in greater detail hereunder with reference to the accompanying drawings which illustrate an embodiment thereof.

A system for disassembling, assembling or reassembling a line of track chain essentially comprising an apparatus A for displacing the track chain according to the present invention and an opposing pair of track presses B located on both sides of the apparatus A at the foremost end thereof is shown in FIG. 1. The structure of the apparatus A is as shown in FIGS. 2 to 4.

In the drawings reference numeral 1 designates a guide table on which a line of track chain to be disassembled is placed. Specifically, the guide table 1 is supported in the horizontal direction on a frame 2 constructed of channel bar or the like steel material in such a manner that it tilts only in the upward or downward direction about a shaft 5 which extends through brackets 4 at the rearmost end thereof. The brackets 4 are fixedly secured to the bottom surface of the guide table 1 and the shaft 5 is rotatably supported by an opposing pair of frame columns 2a and 2b.

Reference numeral 3 designates a slot which is formed on the guide table 1. Reference numeral 6 designates a pair of U-shaped rails of which a rearmost end part 6b is pivotally connected to the shaft 5. Reference numeral 8 designates a trolley which is equipped with four rollers 9 each of which is rotatably held in the U-shaped groove of the rail 6. The trolley 8 is operatively connected to a reciprocatory fluid motor or cylinder 12 adapted to actuate it.

Reference numeral 7 designates a pivotal pin to which the bottom end part of the cylinder 12 is pivotally fitted. The rearmost end part of each of the rails 6 engages with the pivotal pin 7 and the foremost end part of the cylinder rod is connected to the trolley 8 by way of a pin 13.

Reference numeral 10 designates chain-engaging projection in the form of an engagement rod which extends upwardly of the trolley 8 through the slot 3 to the position where it comes in engagement with a bushing of the track chain. Reference numeral 11 designates a projection or abutment member which is made integral with the bottom of the trolley 8. The projection or abutment member 11 is adapted to abut against either of adjustably settable end stoppers 15 and 16 which are threadedly mounted on a stationary screw spindle 14 which extends through a hole 11a in the projection member 11. Reference numerals 14a and 14b designate stationary members at which both the ends of the screw spindle 14 are held immovably. Each of the stoppers 15 and 16 is constructed by a combination of two nuts threadably mounted on the screw spindle 14 and an elastic member 15a, 16a interposed between the nuts. Thus, the stoppers 15 and 16 are inhibited from undesirable movement from the predetermined, adjustably selected positions. The elastic member made of rubber or the like material is preferably designed in the form of an O-ring.

Reference number 17 designates a reciprocatory fluid motor or cylinder for raising and lowering the rails 6. The bottom end of the cylinder 17 is pivotally connected to a pin 18, while the top end 19 of the cylinder rod is pivotally connected to a joint member 20 which is fixedly secured to the bottom of the rails 6.

Reference numeral 21 designates an opposing pair of guide plates which extend forwardly of the foremost end of the guide plate 1. Each of the guide plates 21 is adjustably fitted by means of bolts 22 so as to allow the distance between both guide plates 21 to be selectively determined as required. In the illustrated embodiment, a cylinder actuating lever 23 is designed to actuate both the cylinders 12 and 17 by turning of the lever 23. Alternatively, a cylinder actuating lever may be provided for each of the cylinders.

Next, the operation of the apparatus of the invention as constructed in the above-described manner will be described below as to the case where the apparatus is used for disassembling a line of track chain while displacing the same.

As shown in FIG. 5, a line of track chain 30 is placed on the guide table 1 and the engagement rod 10 on the trolley 8 is brought into engagement with a bushing 31 in the track chain 30.

As the cylinder 17 is actuated by turning the lever 23, the rails 6 are caused to tilt upwardly together as a unit with the guide table 1 up to the position as identified by phantom lines in FIG. 3.

Thus, the bushings 31 in the track chain are located away from the upper end of a jaw insert 24 inserted between the opposed guide plates 21 without any occurrence of engagement between the bushings 31 and the jaw insert 24.

Next, the cylinder 12 is actuated by turning the lever 23 so that the trolley 8 is displaced forward while at the same time thrusting the bushing 31 forward. Thus, the track chain is displaced by a distance equal to one pitch (see FIG. 5).

As is apparent from the drawing, the cylinder stroke P of the cylinder 12, which represents the distance of forward displacement as mentioned above, is equal to the pitch between adjacent links, that is, the distance between V-shaped grooves 25a and 25b on the jaw insert 24. Dimensioning in this way is achieved by selectively setting the distance between both the stoppers 15 and 16.

Since each of the stoppers is constructed by a combination of two nuts with a rubber ring disposed therebetween, it can be easily rotated with an operator's hand without any necessity for using a tool such as a wrench or the like. As shown in the drawings, the stoppers 15 and 16 are accessible from beneath the guide table 1.

The rails 6 are lowered together as a unit with the guide table 1 by retracting the cylinder 17 until the guide table 1 assumes the position where it is supported on the frame 2. After the rails 6 are lowered to the position (as illustrated in FIG. 4) where the engagement rod 10 is disengaged from the bushing, the cylinder 12 is retracted to the original position and the cylinder 17 is then actuated again to raise the rails 6. After the rails 6 are manipulated in this way, the chain on the jaw insert 24 is disassembled by operating both the track presses B and B'

On the other hand, when a line of chain is to be assembled or reassembled, the engagement rod 10 is located at the position opposite to that in FIG. 5 and both the cylinders 12 and 17 are actuated in the reverse sequence.

According to the invention, the feed pitch, which is dimensioned exactly equal to the distance between adjacent links, can be easily selected by adjustably rotating both the stoppers 15 and 16. When a line of track chain is disassembled, assembled or reassembled, the position where operation is initiated can be selected as required within the extent of the length of the slot 3 by rotating either of the stoppers. Thus, the apparatus of the invention can be employed for all types of track chains by changing the start point of operation in dependence on the distance as measured to the track presses and the pitch between adjacent links of the chain. Accordingly, disassembling, assembling or reassembling operation for a line or track chain is performed safely at a high operational efficiency.

While the present invention has been described above with respect to a single preferred embodiment, it should of course be understood that it should not be limited only to this but various changes or modifications may be made in any acceptable manner without any departure from the spirit and scope of the invention.

What is claimed is:

1. An apparatus for displacing a length of track chain lengthwise a predetermined distance, the apparatus comprising: a stationary frame; a guide table slidably receiving thereon a length of track chain during use of the apparatus and having forward and rearward ends and being pivotally mounted at the rearward end thereof on the frame to enable up and down tilting movement of the guide table relative to the frame, the guide table having therein a slot extending lengthwise between the forward and rearward ends; a chain-engaging projection projecting through and displaceable along the guide table slot and being engageable with a track chain slidably disposed on the guide table to effect lengthwise displacement of the track chain in response to displacement of the chain-engaging projection; guiding means disposed beneath the guide table and mounted to undergo tilting movement therewith for guiding the chain-engaging projection for displacement along the guide table slot; a first reciprocatory fluid motor for reciprocably displacing the chain-engaging projection along the guide table slot through forward and return strokes; a second reciprocatory fluid motor connected to effect up and down tilting movement of the guide table and chain-engaging projection together as a unit to thereby effect the engagement and disengagement of the chain-engaging projection with the track chain during up and down tilting movement of the guide table; and adjustably settable stop means disposed entirely beneath the guide table and accessible from beneath the guide table for adjustably setting the end stop positions of the chain-engaging projection to thereby determine the displacement distance of the track chain for each stroke of the first reciprocatory fluid motor.

2. An apparatus according to claim 1; wherein the adjustably settable stop means comprises a pair of stoppers adjustably positionable along the length of the guide table slot and coacting with the guiding means for determining the end positions of displacement of the chain-engaging projection.

3. An apparatus according to claim 2; wherein the guiding means comprises spaced apart guide rails disposed beneath the guide table and extending parallel to the guide table slot, and a trolley rollable along the guide rails and carrying thereon the chain-engaging projection which projects upwardly from the trolley through the guide table slot, the trolley having means for abutting with the pair of stoppers to thereby determine the end positions of displacement of the chain-engaging projection.

4. An apparatus according to claim 3; wherein each of the stoppers comprises two nuts threaded on a threaded spindle with an elastic member interposed therebetween.

5. An apparatus according to claim 3; including means connecting the first reciprocatory fluid motor to the trolley to enable the first fluid motor to reciprocably displace the trolley along the guide rails through forward and return strokes.

6. An apparatus according to claim 5; including means connecting the second reciprocatory fluid motor to the guide rails to effect up and down tilting movement of the guide rails and guide table together as a unit.

7. An apparatus according to claim 3; wherein each of the stoppers comprises two nuts threaded on a common threaded spindle which extends lengthwise between the forward and rearward ends of the guide table, and the means on the trolley for abutting with the stoppers comprises an abutment member depending from the trolley.

8. An apparatus according to claim 7; wherein the abutment member has an opening therethrough through which extends the spindle.

9. An apparatus according to claim 7; wherein each of the stoppers includes an elastic member interposed between the two nuts.

10. An apparatus accoding to claim 2; which each of the stoppers comprises two nuts threaded on a threaded spindle with an elastic member interposed therebetween.

* * * * *